United States Patent
Regunathan et al.

(10) Patent No.: US 11,805,064 B2
(45) Date of Patent: *Oct. 31, 2023

(54) ESTIMATING TERMINAL LOCATION IN A SATELLITE COMMUNICATION SYSTEM

(71) Applicant: HUGHES NETWORK SYSTEMS, LLC, Germantown, MD (US)

(72) Inventors: Murali Regunathan, Germantown, MD (US); Jack Rozmaryn, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 105 days.

This patent is subject to a terminal disclaimer.

(21) Appl. No.: 17/479,681

(22) Filed: Sep. 20, 2021

(65) Prior Publication Data

US 2022/0006754 A1 Jan. 6, 2022

Related U.S. Application Data

(63) Continuation of application No. 16/732,265, filed on Dec. 31, 2019, now Pat. No. 11,128,570.

(51) Int. Cl.
| | |
|---|---|
| *H04L 47/283* | (2022.01) |
| *H04L 43/0864* | (2022.01) |
| *H04B 7/185* | (2006.01) |
| *H04W 16/08* | (2009.01) |
| *H04W 48/04* | (2009.01) |

(Continued)

(52) U.S. Cl.
CPC ....... *H04L 47/283* (2013.01); *H04B 7/18513* (2013.01); *H04B 7/18519* (2013.01); *H04L 43/0864* (2013.01); *H04W 16/08* (2013.01); *H04W 48/04* (2013.01); *H04W 64/003* (2013.01); *H04W 88/16* (2013.01)

(58) Field of Classification Search
CPC ... H04L 47/283; H04L 43/0864; H04L 43/10; H04B 7/18513; H04B 7/18519; H04W 16/18; H04W 48/04; H04W 64/003; H04W 88/16
See application file for complete search history.

(56) References Cited

U.S. PATENT DOCUMENTS

| | | | | |
|---|---|---|---|---|
| 6,298,238 B1 * | 10/2001 | Dai | ........................ | G01S 5/12 |
| | | | | 455/12.1 |
| 6,317,077 B1 * | 11/2001 | Soleimani | ................. | G01S 5/12 |
| | | | | 342/357.77 |

(Continued)

FOREIGN PATENT DOCUMENTS

WO  WO-2017197433 A1 * 11/2017 ............. G01S 19/09

*Primary Examiner* — Afshawn M Towfighi
(74) *Attorney, Agent, or Firm* — Potomac Technology Law, LLC

(57) ABSTRACT

A system and method are disclosed for estimating the location of a satellite terminal. The terminal is selected from among a plurality of terminals, and one or more position estimates are generated for a satellite which provides service to the terminal. The position estimated can be generated, for example, by performing a first one or more iterative grid searches over a plurality of potential position estimates for the satellite. A location estimate is subsequently generated for the terminal by performing a second one or more iterative grid searches over a plurality of potential location estimates for the terminal.

20 Claims, 10 Drawing Sheets

(51) Int. Cl.
*H04W 88/16* (2009.01)
*H04W 64/00* (2009.01)

(56) References Cited

U.S. PATENT DOCUMENTS

| | | | | |
|---|---|---|---|---|
| 6,369,754 | B1* | 4/2002 | Levanon | G01S 5/12 |
| | | | | 342/357.2 |
| 11,617,138 | B2* | 3/2023 | Sharma | H04W 52/282 |
| | | | | 455/522 |
| 2002/0177450 | A1* | 11/2002 | Vayanos | G01S 11/10 |
| | | | | 455/456.1 |
| 2004/0143392 | A1* | 7/2004 | Kilfeather | G01S 5/0036 |
| | | | | 701/469 |
| 2017/0085314 | A1* | 3/2017 | Davis | G01S 19/42 |
| 2017/0085329 | A1* | 3/2017 | Ravishankar | H04W 72/0453 |
| 2017/0223735 | A1* | 8/2017 | Damnjanovic | H04B 7/18517 |
| 2020/0205108 | A1* | 6/2020 | Alasti | H04W 74/0833 |

* cited by examiner

ESTIMATING TERMINAL LOCATION IN A SATELLITE COMMUNICATION SYSTEM

This application is a Continuation of U.S. patent application Ser. No. 16/732,265, filed Dec. 31, 2019, which is incorporated herein in its entirety by reference.

BACKGROUND INFORMATION

High throughput satellite (HTS) systems are used to provide voice and data access in areas that may lack cellular or landline infrastructure. HTS systems typically employ multiple gateways (or satellite hubs) to provide service to customers by utilizing very small aperture terminals (VSATs, or simply "terminals"). Terminals and gateways are often installed at a fixed or permanent location, thereby enabling satellites to transmit data back and forth via "beams".

However, terminals that are initially installed at a fixed or known location (and registered as being at that location) may be moved to a different location by an owner or operator of the terminal. For example, a customer may request installation of a terminal at a location close to a neighboring country which resides within the same beam coverage area. Once service has been initiated, the customer moves the terminal to the neighboring country. Service may continue to operate in a relatively normal same manner due to the footprint of the coverage beam, or using an adjacent beam and possibly more robust transmit parameters. There are currently no reliable methods for distinguishing between an initial install location of a terminal and a new location. Impacts of moving the terminal can cause issues to the transmission layer of a satellite communication network, for example, from a timing, frequency, and signal-to-noise ratio (SNR) perspective. Further, the closed loop timing allows the terminal to operate even after it has been moved, despite the timing offsets calculated to achieve synchronization change.

Further, moving terminals into different locations may cause the terminal to be located in an impermissible or unauthorized location. For example, a terminal may be moved across a political boundary, such as a state or country border. This can result in problems with regulations regarding service, particularly when a different set of regulations is applied to the satellite communications network, and when the operator of the satellite communication network is not notified of the movement of the terminal. Further, a different beam may end up being used to transmit/receive data to the moved terminal, which may not be optimized for the moved terminal.

Based on the foregoing, there is a need for an approach to monitor and/or ascertain a location of terminals within the satellite communication system, and whether or not terminals have been relocated to a different or unauthorized location.

BRIEF SUMMARY

System and method are disclosed for estimating a terminal location in a satellite communication system. According to an embodiment, the system includes: one or more terminals in communication with a satellite; and one or more gateways in communication with the satellite and with each other, and having known locations. The one or more gateways are configured to: identify a plurality of reference terminals associated therewith, wherein a location of each reference terminal is known, and wherein a reference round-trip time (RTT) for signals between each reference terminal and the one or more gateways via the satellite is known, estimate a position of the satellite over each of a plurality of time instances based at least in part on the reference RTTs, and estimate a location of a selected terminal associated with a selected gateway from the one or more gateways based, at least in part, on the estimated satellite positions, the location of the selected gateway, and an RTT for signals between the selected terminal and the selected gateway.

According to another embodiment, the method includes: identifying a plurality of gateways in communication with a satellite, wherein a location of each gateway is known; identifying a plurality of reference terminals associated with one or more of the plurality of gateways, wherein a location of each reference terminal is known, and wherein a reference round-trip time (RTT) for signals between each reference terminal and the one or more gateways via the satellite is known; estimating a position of the satellite over each of a plurality of time instances based at least in part on the reference RTTs; and estimating a location of a selected terminal associated with a selected gateway from the plurality of gateways based, at least in part, on the estimated satellite positions, a known location of the selected gateway, and an RTT for signals between the selected terminal and the selected gateway.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

Methods and systems are described herein for estimating a location of a terminal operating in a satellite communication system. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

As used herein, the term "position" generally refers to a position within a 3-dimensional (3D) space, such as a position of a satellite using a 3D coordinate system (i.e., X, Y, Z axes). Additionally, the term "location" generally refers to a location within a 2-dimensional space, such as a terrestrial location of a terminal or a gateway using, for example, latitude and longitude. According to the disclosed embodiments, one or more position estimates for the satellite serving the terminal are determined by performing a first one or more iterative grid searches over a plurality of potential position estimates for the satellite. The satellite positions may be estimated for multiple time instances using various terminals and gateways having known location round-trip-time (RTT) information. One or more location estimates for the terminal may be determined by performing a second one or more iterative grid searches over a plurality of potential location estimates for the terminal. This step involves estimating the position of the terminal of interest using the estimated satellite positions for the different time instances, the known gateway locations, and the RTT for that terminal. The iterative grid searches are employed to solve the nonlinear estimation problem since the dimensionality is low. For example, multiple position and/or location estimates may be chosen, and the position/location with the minimum error is found, and additional search(es) performed around that position/location with a higher resolution. This allows a search for the global minimum without resulting in extreme time consumption. Further, this process may be performed for several satellites in a satellite communication system, with the calculations being performed for different terminals and gateways communicating using each satellite. Thus, updated location information can be maintained for numerous terminals, and those terminals that are determined to be outside a designated or authorized range can be identified.

Figure 1:
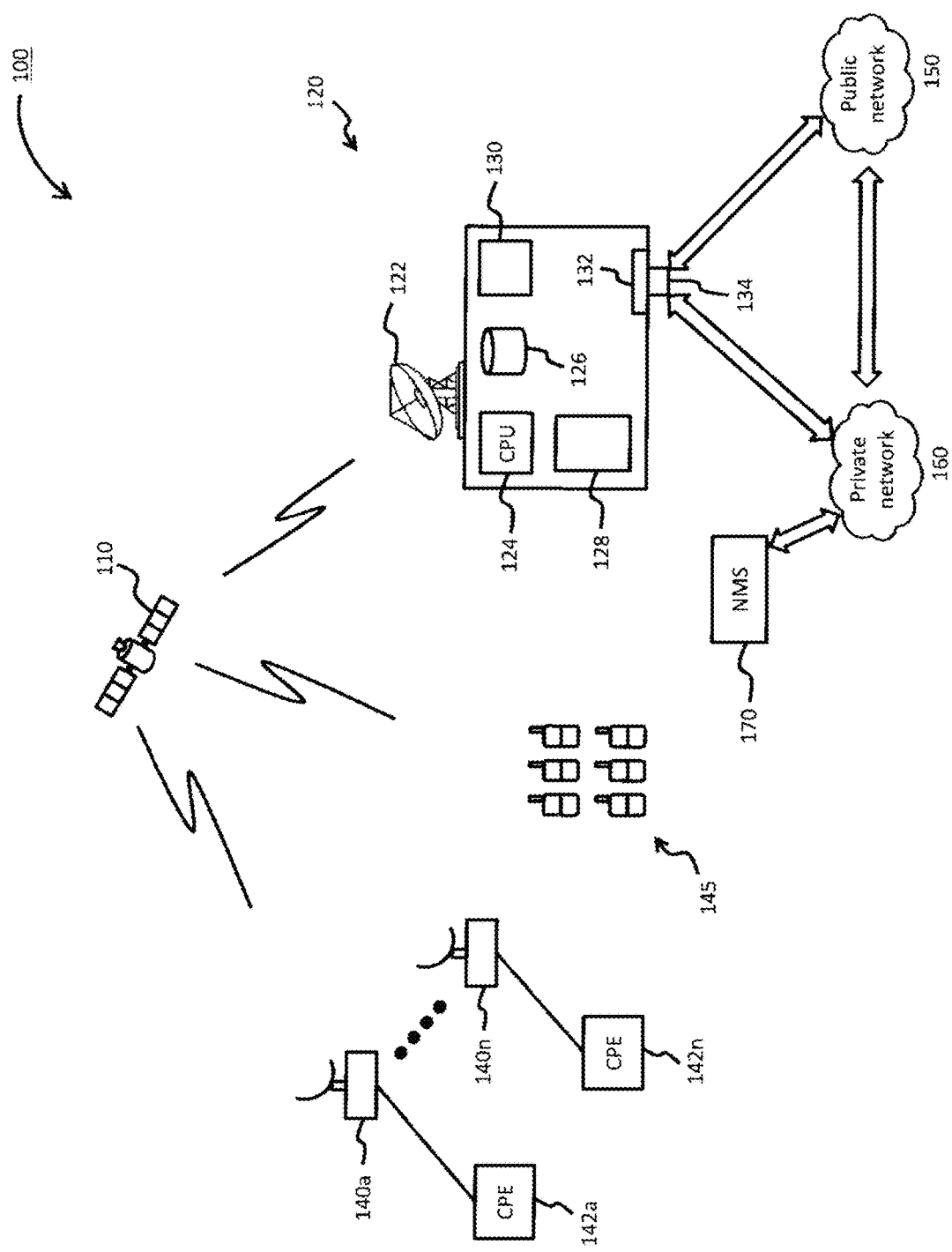
FIG. 1 is a diagram of a satellite system for estimating a terminal location in a satellite communication system, according to one or more embodiments.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public internet 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the CPU 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
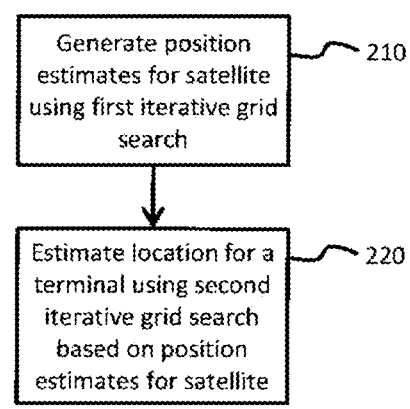
FIG. 2 is a flowchart of a process for estimating a terminal location in a satellite communication system, according to one or more embodiments.

FIG. 2 is a flowchart of a process for estimating a terminal location in a satellite communication system, according to one or more embodiments. The satellite communication system can include components similar to those illustrated in satellite communication system 100, such as a satellite that supports communications among any number of gateways and terminals. According to the various embodiments, the satellite may be positioned in a geosynchronous orbit at an altitude of approximately 22,000 miles (40,000 km). Furthermore, the satellite may be subject various positional drift within its ephemeris orbit which results in movement within a bounded box of approximately 20-30 km range in x, y, z coordinates. Thus, determining the actual satellite position, rather than the expected position, ensures accurate location estimation for the terminal of interest.

As illustrated in FIG. 2, the satellite position is estimated, at 210, using triangulation for multiple time instances based on known locations and round-trip-times (RTTs) of various terminals and gateways. The RTTs can be used, for example, to determine a one or more potential slant ranges for the satellite. Slant ranges with minimum errors are subsequently used to generate the satellite positions. According to various embodiments, a plurality of gateways in communication with the satellite are identified. Since the gateways typically occupy fixed physical structures under the control of the satellite service provider, their physical locations are known. In addition to the gateways, a plurality of reference terminals associated with each gateway are identified. A location of each reference terminal is also known. Further, a plurality of known RTTs (for signals between each gateway and corresponding reference terminal) is obtained. The slant range (i.e. distance of signal traveled been the terminal and gateway via the satellite at each position) is determined for various position estimates of the satellite. For example, the slant range SR associated with a satellite S (having a position P) between a gateway G and a reference terminal T (each having known locations L) can be determined based on the following equations, where $RTT_{T,G}$ is the total time it takes for an electrical signal to go from the terminal to the satellite, the satellite to the gateway, and back to the terminal:

$$SR = RTT_{T,G} * \frac{c}{2}$$
$$= SR_{G,T} + SR_{T,G}$$
$$= \|Ps - L_T\|_2 + \|Ps - L_G\|_2$$

The above equations involve a trilateration (or triangulation), and present a non-linear estimation problem that, in an exemplary embodiment, may be solved by an iterative grid search. The gateway and terminal locations L are known and the satellite position P is estimated using the slant range (SR), which is determined for different time instances and potential positions by determining the L2 norm of the distances between the potential positions and the terminal and/or the gateway. An L2 norm calculates a distance of the vector coordinate from an origin of a vector space, and may also be referred to as the Euclidean norm. The result is a positive distance value. For example, a plurality of initial positions P for the satellite can be selected, and a first grid search is performed over a first space defined by the initial plurality of positions of the satellite. According to an embodiment, the first space can be a 3-dimensional (3D) space that is iteratively narrowed to obtain a coarse position estimate, based on a first minimum error. The position with a minimum error is found and another search is performed around that position with a better resolution. For example, the following equation can be used to obtain the minimum error, where i represents a number of iterations, n represents an instance, j represents a terminal, and Q represents a maximum number of instances (i.e. a predefined time period):

$$err_i(n) = \sum_{j=1}^{Q}(err_{i,j}(n))^2$$

Using the equations above, a least square error is determined between observed and calculated values between satellite position, and terminal and gateway locations, and the satellite position determined therefrom. Specifically, a coarse grid search is performed that covers the range of potential satellite positions P, at a resolution that is kept low to minimize computation time. Once a coarse position with a minimum error is found, a finer resolution search is performed in a smaller space around the obtained coarse position. This is repeated for a plurality of time instances. For example, after a position for a first time instance is determined, the determined position is used as a starting point for a subsequent grid search at the next time instance. Further, the subsequent grid search uses a finer resolution than the previous grid search, which enables reduction of the search space in computation time, particularly given that the satellite does not move fast. Consequently, the satellite position is estimated for a plurality of time instances over a predefined duration, resulting in a set of satellite positions. In an exemplary implementation, at least one hundred time instances n are used over a predefined period Q comprising several minutes, e.g. 15 minutes.

At 220, a location is determined for a selected terminal of interest, based on a second iterative grid search and using the position of the satellite determined in step 210. The second iterative grid search is performed over a second space defined, at least in part, by a predetermined initial location for the selected terminal. For example, the terminal may have been installed at an initial location and then relocated. Thus, the terminal is presumed to be at the initial location, which is known from the installation process. The second space may include, for example, a plurality of locations in the vicinity of the initial location or surrounding the initial location. Furthermore, the second search is performed at a low resolution. According to at least one embodiment, the second space may be a 2-dimensional (2D) space, owing to the fact that terminal locations are terrestrial and on the surface of the earth unlike the satellite positions in 3D space. Thus, this second grid search includes iteratively narrowing the second space to obtain a coarse location estimate based on a second minimum error, and performing additional searches with increasing resolution over the coarse location estimate to obtain the location of the selected terminal. The second grid search is similar to the first grid search, in that it utilizes the non-linear least squares estimate to estimate the location of the selected terminal starting with a low-resolution search over an initial set of locations on earth. According to at least one embodiment, the initial set of locations is formed around an install location of the terminal. Alternatively or additionally, the initial set of locations can be formed around a last-known location of the terminal. In either case, an initial coarse search is performed with a low resolution of points and a large grid size, and one or more successive or subsequent iterations are performed on the results of each gradually decreasing space with an increasing resolution of locations. Further, each subsequent iteration uses the previous location estimate as a starting point for the next grid. These operations will be discussed in further detail with regards to the flowcharts of FIGS. 4A-4C and 5.

Figure 3:
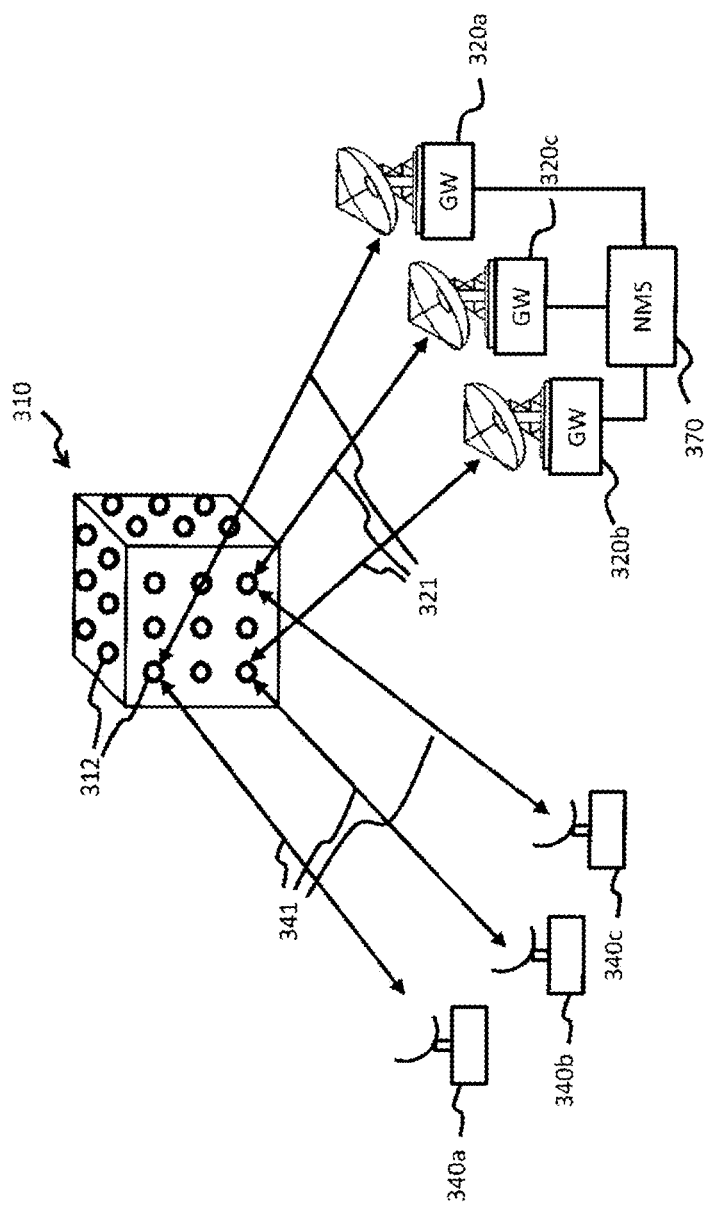
FIG. 3 is a diagram illustrating exemplary satellite positions and slant ranges, according to one or more embodiments.

FIG. 3 is a diagram illustrating exemplary satellite positions and slant ranges, according to one or more embodiments. A plurality of satellite positions 312 are determined within a 3D space 310, and RTTs between a plurality of gateways 320 and a corresponding plurality of terminals 340 are determined. According to one or more embodiments, the satellite may be positioned at an altitude of approximately 22,000 miles (40,000 km), such that 3D space 310 represents a 20-30 km range in x, y, z coordinates. The RTTs can be used to determine one or more potential slant ranges for a satellite occupying space 310, and slant ranges with minimum errors are used to generate the satellite positions 312. As described above with reference to FIG. 2 (and in more detail with reference to FIGS. 4A-4C), determining a position of a satellite involves identifying a plurality of gateways 320a-320c and reference terminals 340a-340c with known locations and that are configured to communicate via the satellite.

Although only three gateways 320 and three reference terminals 340 are illustrated, any number of reference terminals 340 and gateways 320 may be used to estimate the satellite position. Further, multiple terminals can be served by one gateway. For example, a single gateway 320 may manage a plurality of satellite beams and all terminals 340 located within those beams. Thus, the reference terminals 340 are selected based on having a known location, and gateways 320 associated with the terminals 340 (and having known locations) are also used to determine the RTTs. Based on known RTTs for signals traversing distances 321 and 341, a plurality of slant ranges are determined for potential positions 312, which are narrowed to obtain a coarse position estimate, based on a first minimum error. The position 312 with a minimum error is found and another search is performed around that position 312 with a better resolution. Further, the subsequent grid search uses a finer resolution for space 310 than the previous grid search, which enables reduction of the search space in computation time, particularly given that the satellite does not move fast. Consequently, the satellite position is estimated for a plurality of time instances over a predefined duration, resulting in a set of satellite positions. Further, for each different time instance during the search duration, different sets of reference terminals 340 and/or gateways 320 can be used to estimate the satellite positions. For example, each iteration of the search can use the same or different reference terminals 340 and/or gateways 320. As further illustrated in FIG. 3, a network management system (NMS) 370 is provided for managing various aspects of the gateways 320. As previously discussed with respect to FIG. 1, for example, the NMS 370 can maintain, in part, information (configuration, processing, management, etc.) for the gateway 320, and all terminals 340 and beams supported by the gateway 320. Accordingly, the NMS 370 can be configured to share information necessary to estimate terminal locations with any necessary gateway 320. If gateway 320a is estimating the location of a terminal 340, for example, the NMS 370 can be configured to supply gateway 320a with necessary information from gateway 320b and gateway 320c. The NMS 370 can also estimate the location of any terminal 340 since it actively manages aspects of all gateways 320 and terminals 340.

Figure 4A:
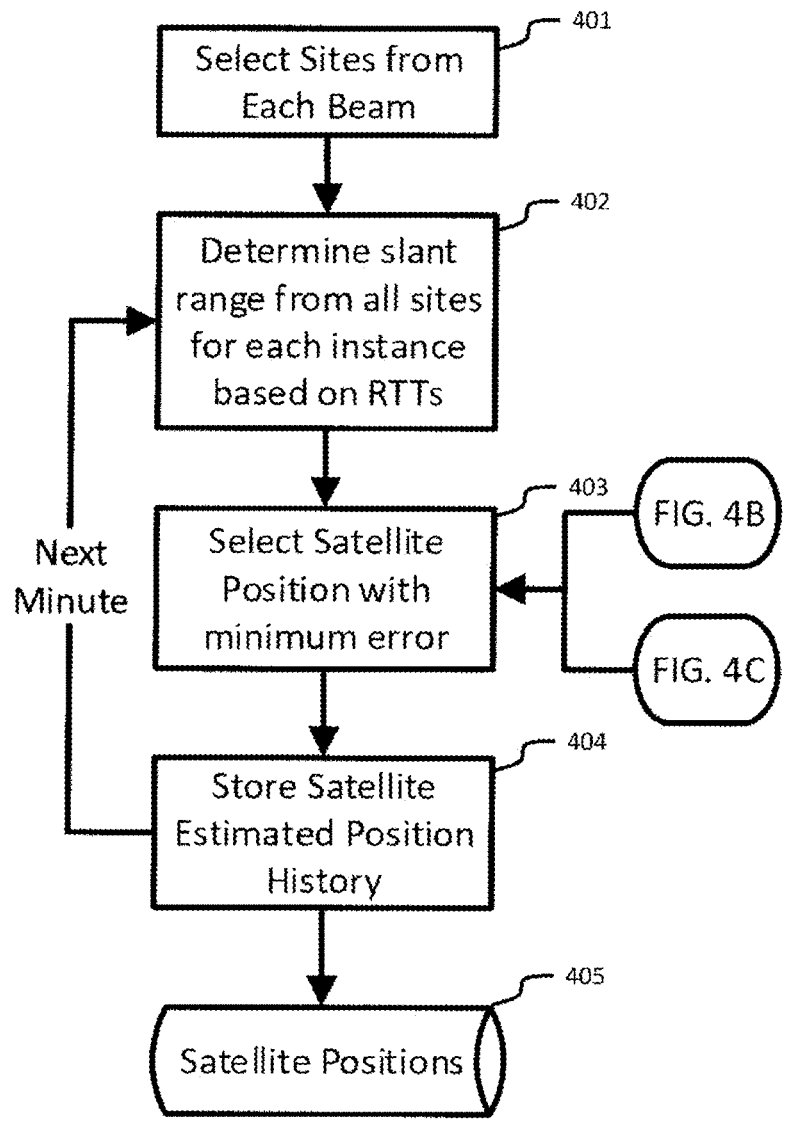
FIGS. 4A-4C are flowcharts of a process for estimating a satellite position in a satellite communication system, according to one or more embodiments.
Figure 4B:
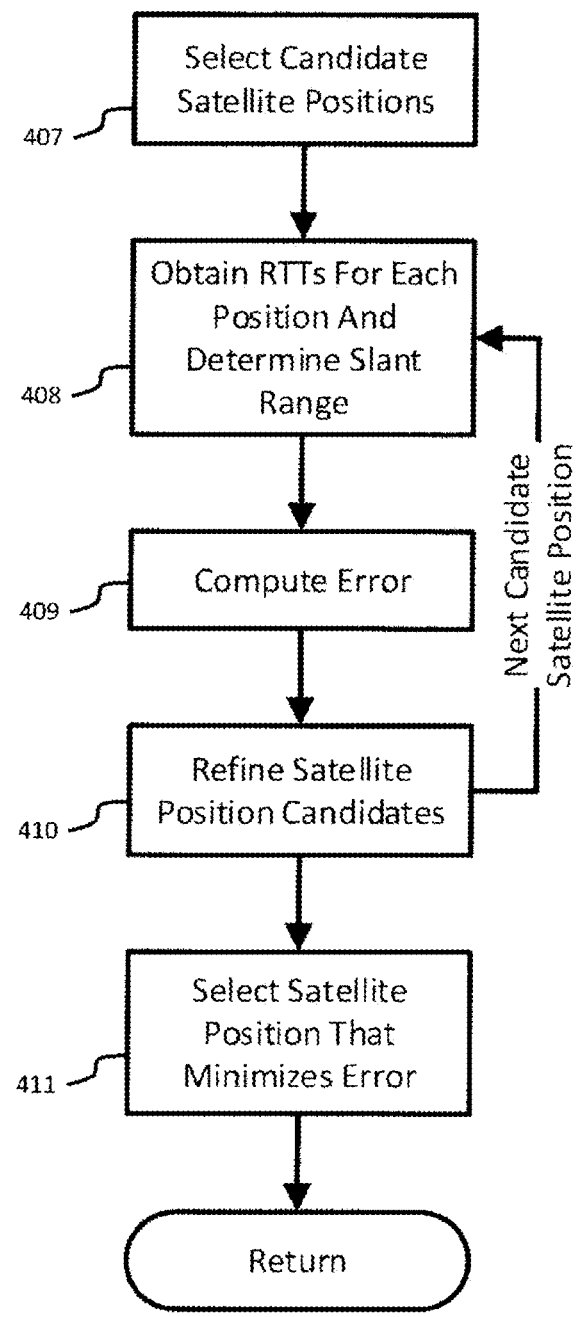
Figure 4C:
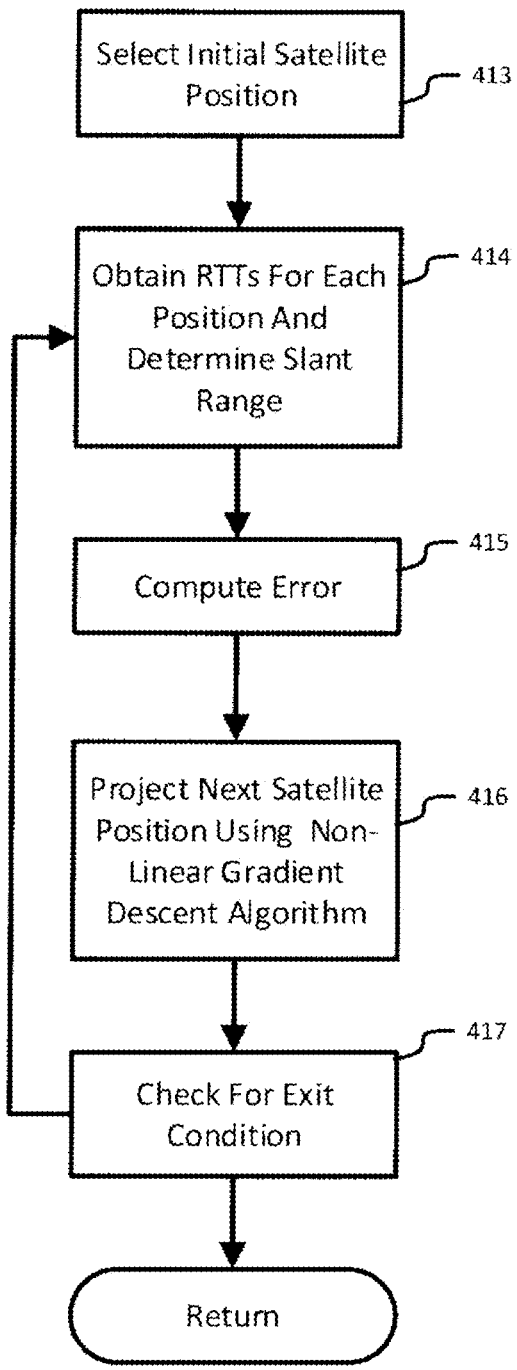

FIGS. 4A-4C are flowcharts of a process for estimating a satellite position in a satellite communication system, according to one or more embodiments. At 401, a plurality of sites are selected from each beam used to define the satellite coverage area. For example, a gateway may manage multiple satellite beams and all terminals residing within those beams. Thus, the plurality of sites may include, in part, terrestrial locations of a gateway which manages five beams and one or more terminals from each of the five beams. From these sites, reference terminals with known locations may be selected, along with corresponding gateways. At 402, slant ranges are determined from all sites (i.e. reference terminal and gateway locations) based on the measured (or otherwise obtained) RTTs associated with each reference terminal, as described above. Slant range measurements in operation 420 are associated with a time interval, such as 1 minute, during which outliers may be filtered. At 403, a position with a minimum error is obtained. This operation can utilize the known locations of the gateways, as well as candidate positions for the satellite. For example, candidate positions for the satellite may be determined in two different ways, respectively illustrated in the flowcharts of FIGS. 4B and 4C. In either case, the error can be determined by any means that minimizes a sum squared residual, e.g. as performed in the equation below:

$$\text{Err}(t) = \text{Measured Slant Range for Terminal } t - \text{Calculated Slant Range for Terminal } t$$

$$\text{Error Minimization} = \Sigma \text{Err}(t)^2 \text{ (where the sum is taken over all time instants)}$$

The result of operation 403 is a satellite position that has a minimum error for a time instant, and is stored at 404 in satellite positions database 404. Further, operations 402-404 are repeated for the next minute, until each minute (or any other time interval) of a predefined time period is completed. Filtration of noise, outliers, etc. may be performed in between any step or upon determining that the results include random variables, noise, or other values outside a range of possible locations. At 405, the estimated position for the satellite is stored in a satellite position file.

With reference to the flowchart of FIG. 4B, a method is described for determining a refined best candidate position for a satellite in accordance with the embodiments described above. At 407, candidate positions are selected for a satellite. Selection of candidate positions may reference a known list of gateway locations for gateways that are in communication with the satellite and/or the reference terminals obtained previously. At 408, RTTs are obtained for each candidate position, and the slant range is determined therefrom. At 409, an error is computed for the candidate position. This can include, for example, a residual error calculation based on a difference between the measured slant rate versus the calculated slant rate, as well as obtaining the least square error, as described above with reference to step 409. At 410, the satellite position candidates are refined, and the steps 408-410 are repeated for each candidate satellite position. Finally, at 411 the satellite position with the minimized error is returned back to step 403 of FIG. 4A.

With reference to the flowchart of FIG. 4C, a method is described for determining candidate positions using non-linear gradient descent. In this method, at 413, an initial satellite position is selected. The initial satellite position may be in the form of an orbital box, and may reference a known list of gateway locations for gateways that are in communication with the satellite and/or the reference terminals obtained previously. At 414, a slant range is determined for each position based on RTTs as described above. At 415, an error is computed for the candidate position. This can include, for example, a residual error calculation based on a difference between the measured slant rate versus the calculated slant rate, as well as obtaining the least square error, as described above with reference to step 409. At 416, a next satellite position is projected using a non-linear gradient descent algorithm, which can include a first-order iterative optimization algorithm for finding a local minimum of a function (e.g. error function in this embodiment). The method is repeated until an exit condition is satisfied at 417, upon which the method returns to step 403 of FIG. 4A. According to an embodiment, the exit condition can include a condition where the sum of all the errors squared is minimized. As described above, this minimization can be performed for a plurality of time instances or over a predetermined time period.

Figure 5:
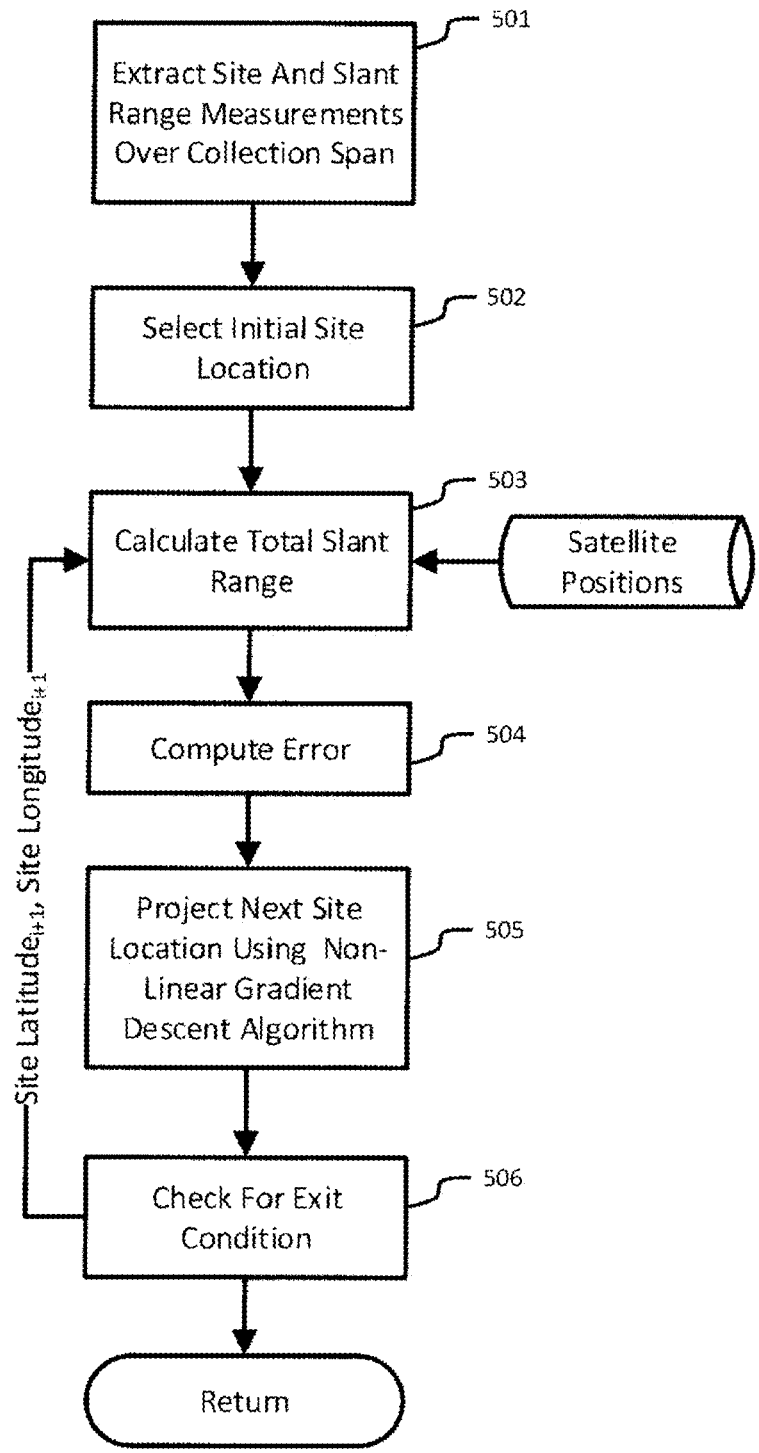
FIG. 5 is a flowchart of a process for estimating a terminal location in a satellite communication system, according to one or more embodiments.

FIG. 5 is a flowchart of a process for estimating a terminal location in a satellite communication system, according to one or more embodiments. As described above, a selected terminal's location is determined based on a second iterative grid search and using the position of the satellite determined during the first iterative grid search detailed above. Thus, at 501, the slant range measurements over a collection span are obtained for the specific terminal of interest. For example, the terminal of interest may be one of a plurality of terminals coupled to the satellite, with some of the plurality of terminals having known locations and being used as reference terminals described above. Whereas, the terminal of interest may not have a known location, or may have a last-known location that has not been updated. Thus, the slant range measurements over a historic collection period (e.g. period of time) for the satellite positions is retrieved at 501. Although not illustrated herein, outlier values may be filtered so as to improve efficiency of subsequent iterative grid searches. At 502, an initial site location is selected. As described herein, the grid search for the terminal location is performed over a second space defined, at least in part, by a predetermined initial location for the selected terminal. For example, the terminal may have been installed at an initial location and then relocated. Thus, the second space includes a plurality of locations at a low resolution, using a 2D coordinate system such as, for instance, latitude and longitude.

At 503, a total slant range is calculated for the terminal based on the satellite positions obtained in previous steps, and known location for the gateway associated with the selected terminal. Further at 504, an error is computed for the total slant range, based on the difference between the measured and calculated slant ranges as described above, and a minimization of an error function is determined. At 505, a next site location is determined using the non-linear gradient descent algorithm, and the method is repeated for different site locations (having different latitudes and longitudes) until an exit condition is satisfied at 506. For example, the exit condition can include a condition where the sum of all the errors squared is minimized. As described above, this minimization can be performed for a plurality of time instances or over a time period. Eventually, a location with the minimum error is returned in the form of terrestrial coordinates for the selected terminal.

Figure 6:
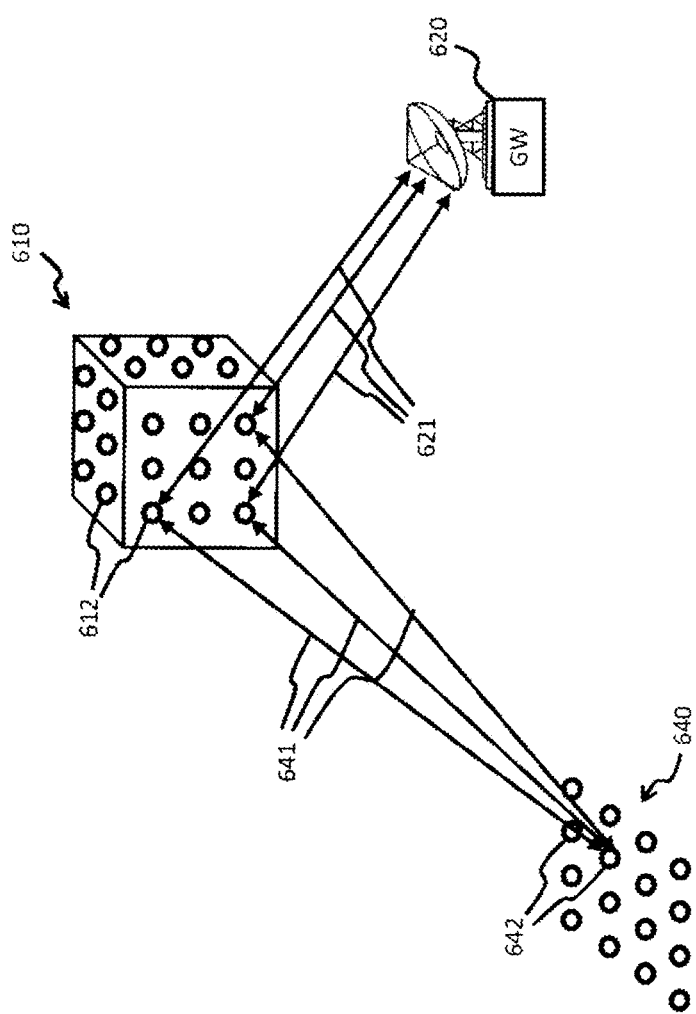
FIG. 6 is a diagram illustrating exemplary terminal locations, according to one embodiment.

FIG. 6 is a diagram illustrating exemplary terminal locations, according to one embodiment. As described above with reference to FIG. 3, the satellite position is estimated for a plurality of time instances over a predefined duration, resulting in a set of satellite positions 312. Thus, for each of the resulting satellite positions 612 over a 3D space 610, a location is determined for a selected terminal of interest. According to various embodiments, the location can be determined based on a second iterative grid search as detailed above with reference to FIGS. 2 and 5. The second iterative grid search is performed over a second space 640 defined, at least in part, by a predetermined initial location for the selected terminal, and includes a plurality of locations 642 at a low resolution (and increasingly higher resolution with subsequent grid searches). Further, this second space 640 may be a 2-dimensional (2D) space, owing to the fact that terminal locations are terrestrial and on the surface of the earth unlike the satellite positions in 3D space 610. Thus, this second grid search includes iteratively narrowing the second space 640 to obtain a coarse location estimate based on a second minimum error, and performing additional searches with increasing resolution over the coarse location estimate to obtain the location of the selected terminal. As previously discussed, the second grid search is similar to the first grid search, in that it utilizes the non-linear least squares estimate to estimate the location of the selected terminal starting with a low-resolution search over an initial set of locations on earth. In an exemplary embodiment, the initial set of locations is formed around an install location of the terminal. Alternatively or additionally, the initial set of locations can be formed around a last-known location of the terminal.

In either case, a total slant range is calculated for the terminal based on the satellite positions 612 and the RTT across distances 641, 621, an error is computed for the total slant range, and a minimization of an error function is determined. This is repeated for each site location 642, narrowed using the non-linear gradient descent algorithm, resulting in a location with the minimum error is returned in the form of terrestrial coordinates for the selected terminal. These operations are performed until an error metric converges. Further, these operations can be performed for a plurality of terminals associated with gateway 620, by identifying one or more remaining terminals determined to be in restricted locations. According to one or more embodiments, once a terminal is determined to be in a restricted location, terminal may be locked in order to prevent further use thereof. More particularly, the satellite network provide may stop or suspend all services for terminals located in restricted locations. It would therefore become necessary to contact the satellite service provider in order to unlock or otherwise reactivate the terminal.

In addition to the embodiments described above, additional enhancements can be made to improve accuracy of the satellite positions and resulting terminal locations. According to one or more embodiments, instead of using an absolute minimum as the grid center for each subsequent iterative search, a centroid of the top local minima may be used. Further, forward signal-to-noise ratio (SNR) values from the terminal can be used to improve the accuracy. For example, an expected SNR value for different grid points in the 3D space can be compared with the measured SNR values, and the metric to be minimized can be based on the following equation, where a clear-sky value of the SNR is used, and n represents a time instance as described above:

$$err2_i(n) = SNR_i - SNR_{meas_{clearsky}}(n)$$

$$err_i = \sum_{n=1}^{q} \left[ (err_i(n))^2 + (err2_i(n))^2 \right]$$

Thus, a first error metric based on the slant ranges is bolstered with a second error metric based on the SNRs.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into, or used to implement, the previously described receivers, transmitters, transceivers, gateway, network management system, fault management unit, modulator/demodulator, etc. Additionally, such hardware can be interfaced to connect and/or facilitate communication between different components such as the automobile infotainment system and receiver. Furthermore, various features can be implemented using algorithms illustrated in the form of flowcharts and accompanying descriptions. Some or all steps associated with such flowcharts can be performed in a sequence independent manner, unless otherwise indicated.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 7:
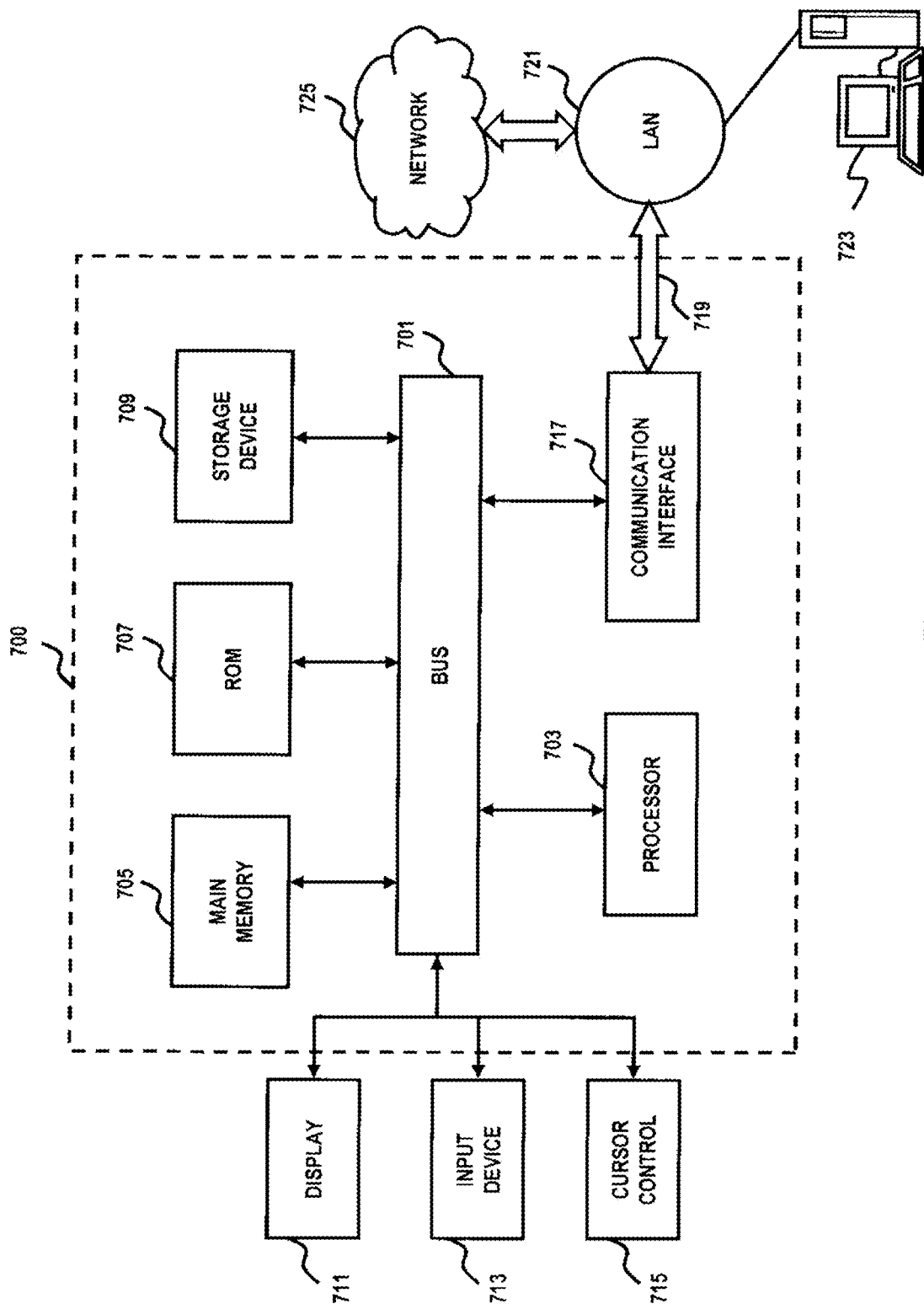
FIG. 7 is a diagram of a computer system that can be used to implement various exemplary features and embodiments.

FIG. 7 is a diagram of a computer system that can be used to implement features of various embodiments. The computer system 700 includes a bus 701 or other communication mechanism for communicating information and a processor 703 coupled to the bus 701 for processing information. The computer system 700 also includes main memory 705, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a light emitting diode (LED) or other flat panel displays, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711. Additionally, the display 711 can be touch enabled (i.e., capacitive or resistive) in order facilitate user input via touch or gestures.

According to an exemplary embodiment, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement exemplary embodiments. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 717 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a High Definition Multimedia Interface (HDMI), etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 such as a wide area network (WAN) or the Internet. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Non-volatile media can further include flash drives, USB drives, microSD cards, etc. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 8:
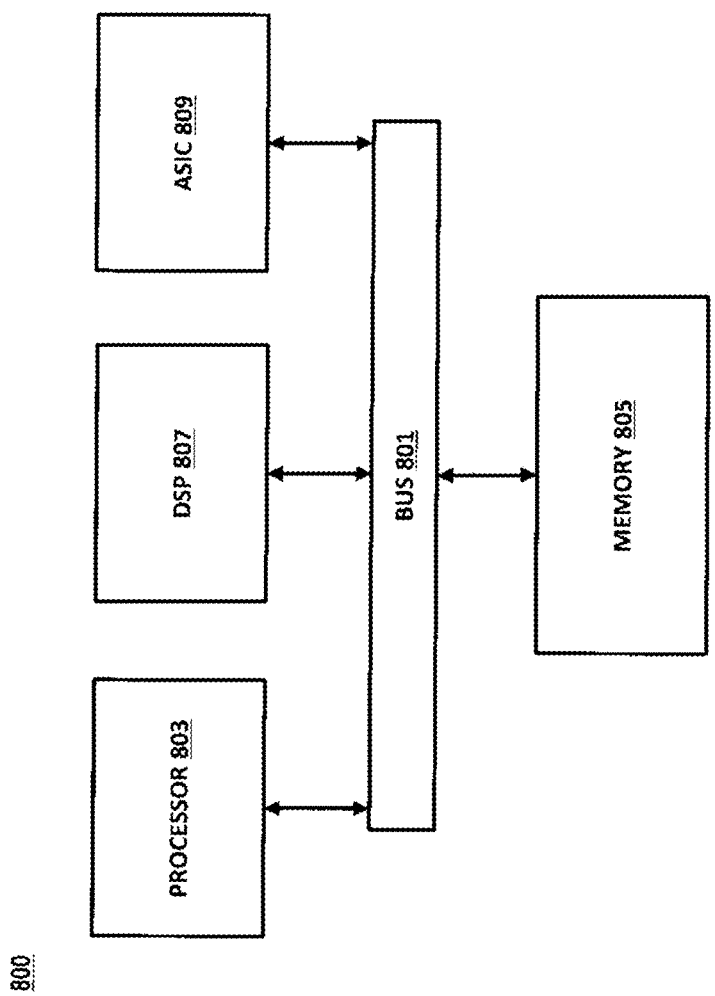
FIG. 8 is a diagram of a chip set that can be used to implement various exemplary features and embodiments.

FIG. 8 illustrates a chip set 800 upon which features of various embodiments may be implemented. Chip set 800 is programmed to implement various features as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of the figures.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or additionally, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 805 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:

determining a plurality of estimates for positions of a satellite that services a one terminal of a plurality of terminals, for a plurality of time instances, by performing one or more iterative first grid searches over a plurality of potential position estimates for the satellite, wherein the determination of the satellite position estimates is based on known locations of a plurality of reference terminals, known locations of a plurality of gateways and respective round-trip-time (RTT) information for communications between one or more of the reference terminals and a respective one or more of the plurality of gateways servicing the one or more reference terminals; and determining a plurality of estimates for locations of the selected terminal by performing one or more iterative second grid searches over a plurality of potential location estimates for the selected terminal, wherein the determination of the terminal location estimates is based on the plurality of estimates for the positions of the satellite, the known gateway locations and RTT information for the selected terminal.

2. The method of claim 1, wherein the one or more iterative first grid searches are performed over a plurality of time instances.

3. The method of claim 1, wherein the performing of the one or more iterative first grid searches further comprises:
iteratively narrowing a first space defined by the position estimates for the satellite to obtain coarse position estimates based on a first minimum error; and
performing additional searches with increasing resolution over the coarse position estimates to obtain a position for the satellite.

4. The method of claim 3, wherein the first space comprises a 3-dimensional (3D) space.

5. The method of claim 1, wherein the one or more iterative second grid searches are performed over a plurality of time instances.

6. The method of claim 1, wherein the performing of the one or more iterative second grid searches further comprises:
iteratively narrowing a second space defined by the position estimates for the selected terminal to obtain a coarse position estimate based on a first minimum error; and
performing additional searches with increasing resolution over the coarse position estimate to obtain a position for the selected terminal.

7. The method of claim 6, wherein the second space comprises a 2-dimensional (2D) space.

8. The method of claim 1, wherein the satellite is one of a constellation of satellites.

9. A system comprising:
at least one satellite;
a plurality of terminals; and
a plurality of gateways of known locations, each configured to service one or more of the plurality of terminals; and
wherein at least one of the plurality of gateways, which services a first terminal of the plurality of terminals, is configured to determine a plurality of estimates for positions of a first satellite of the plurality of satellites, for a plurality of time instances, by performing one or more iterative first grid searches over a plurality of potential position estimates for the satellite, wherein the determination of the satellite position estimates for the first satellite is based on known locations of a plurality of reference terminals, known locations of the plurality of gateways and respective round-trip-time (RTT) information for communications between one or more of the reference terminals and a respective one or more of the plurality of gateways servicing the one or more reference terminals; and
wherein the at least one of the plurality of gateways, which services the first terminal of the plurality of terminals, is configured to determine a plurality of estimates for locations of the first terminal by performing one or more iterative second grid searches over a plurality of potential location estimates for the first terminal, wherein the determination of the first terminal location estimates is based on the plurality of estimates for the positions of the first satellite, the known gateway locations and RTT information for the first terminal.

10. The system of claim 9, wherein the one or more iterative first grid searches are performed over a plurality of time instances.

11. The system of claim 9, wherein the at least one of the plurality of gateways, which services the first terminal of the plurality of terminals, is configured to perform the one or more iterative first grid searches by:
iteratively narrowing a first space defined by the position estimates for the first satellite to obtain coarse position estimates based on a first minimum error; and
performing additional searches with increasing resolution over the coarse position estimates to obtain a position for the first satellite.

12. The system of claim 11, wherein the first space comprises a 3-dimensional (3D) space.

13. The system of claim 9, wherein the one or more iterative second grid searches are performed over a plurality of time instances.

14. The system of claim 9, wherein the at least one of the plurality of gateways, which services the first terminal of the plurality of terminals, is configured to perform the one or more iterative second grid searches by:
iteratively narrowing a second space defined by the position estimates for the first terminal to obtain a coarse position estimate based on a first minimum error; and
performing additional searches with increasing resolution over the coarse position estimate to obtain a position for the first terminal.

15. The system of claim 14, wherein the second space comprises a 2-dimensional (2D) space.

16. The system of claim 9, wherein the satellite is one of a constellation of satellites.

17. A method for estimating a location of a terminal, the method comprising:
selecting the terminal from among a plurality of terminals in a satellite communication system;
generating one or more position estimates for a satellite serving the terminal by performing a first one or more iterative grid searches over a plurality of potential position estimates for the satellite, and performed over a plurality of time instances, and performing additional searches with increasing resolution over the coarse position estimates to obtain a position for the satellite; and
based on the one or more position estimates, generating a location estimate for the terminal by performing a second one or more iterative grid searches over a plurality of potential location estimates for the terminal; and
iteratively narrowing a first space defined by the position estimates for the satellite to obtain coarse position estimates based on a first minimum error.

18. The method of claim 17, wherein the performing a second one or more iterative grid searches further comprises:
iteratively narrowing a second space defined by the position estimates for the terminal to obtain a coarse position estimate based on a first minimum error; and
performing additional searches with increasing resolution over the coarse position estimate to obtain a position for the terminal.

19. A system comprising:
one or more terminals in communication with a satellite;
one or more gateways in communication with the satellite and having known locations; and
a network management system (NMS) in communication with the one or more gateways, the NMS being configured to:
identify a plurality of reference terminals associated therewith, wherein a location of each reference terminal is known, and wherein a reference round-trip time (RTT) for signals between each reference terminal and the one or more gateways via the satellite is known, estimate a position of the satellite over each of a plurality of time instances based, at least in part, on the reference RTTs, and estimate a location of a selected terminal associated with a selected gateway from the one or more gateways based, at least in part, on the estimated satellite positions, the location of the selected gateway, and an RTT for signals between the selected terminal and the selected gateway; and wherein the NMS is configured to estimate the position of the satellite by performing a first grid search over a first space defined by the estimated satellite positions.

20. The system of claim 19, wherein the one or more gateways are configured to perform the first grid search by:

iteratively narrowing the first space defined by the estimated satellite positions to obtain a coarse position estimate based on a first minimum error; and performing additional searches with increasing resolution over the coarse position estimate to obtain the position for the satellite.

\* \* \* \* \*